United States Patent [19]
Abe et al.

[11] Patent Number: 5,677,707
[45] Date of Patent: Oct. 14, 1997

[54] METHOD AND APPARATUS FOR DISPLAYING A PLURALITY OF IMAGES ON ONE DISPLAY IMAGE BY CARRYING OUT FILTERING OPERATION

[75] Inventors: Yoshitaka Abe; Keiichi Murakami, both of Kawasaki, Japan

[73] Assignee: Fujitsu Limited, Kawasaki, Japan

[21] Appl. No.: 63,660

[22] Filed: May 20, 1993

[30] Foreign Application Priority Data

May 20, 1992 [JP] Japan .................................. 4-127696

[51] Int. Cl.⁶ .................................................. G09G 5/00
[52] U.S. Cl. .......................... 345/115; 345/118; 73/623; 73/626; 128/661.01
[58] Field of Search ........................... 345/115, 118, 345/119, 213, 138; 128/661.01; 73/626, 618, 623

[56] References Cited

U.S. PATENT DOCUMENTS

| | | |
|---|---|---|
| 4,398,540 | 8/1983 | Takemura et al. .................... 128/660 |
| 4,471,785 | 9/1984 | Wilson et al. .................... 128/661.01 |
| 4,816,812 | 3/1989 | Iida .................................... 345/115 |

FOREIGN PATENT DOCUMENTS

| | | |
|---|---|---|
| 0 254 440 | 1/1988 | European Pat. Off. . |
| 0 415 324 | 3/1991 | European Pat. Off. . |

OTHER PUBLICATIONS

Sato, "Picture Signal Processor Using Acyclic Digital Filter," *Patent Abstracts of Japan*, vol. 13, No. 195 (E–754), May 10, 1989 & JP–A–01 016116 (Nikon), Jan. 19, 1989.

*Primary Examiner*—Richard Hjerpe
*Assistant Examiner*—Kent Chang
*Attorney, Agent, or Firm*—Staas & Halsey

[57] ABSTRACT

An image display apparatus, which is used to display a plurality of images on one display image by carrying out a filtering operation, comprises a memory unit, a filter unit, a write control unit, a delay unit, and a switching unit. The write control unit controls the writing of the display data at a region having a specific address length between adjacent display-regions, when storing the display data into the memory unit. The filter unit applies a filtering operation to the display data read out from the memory unit along the display scanning direction, and the delay unit gives a different delay value to the display data output from the filter unit. The switching unit switches the display data having a different delay value output from the delay unit at a boundary line of the adjacent display-regions. Therefore, the length between the adjacent display-regions can be shortened, and an image having a preferable length between the adjacent display-regions without an intervention can be displayed.

18 Claims, 14 Drawing Sheets

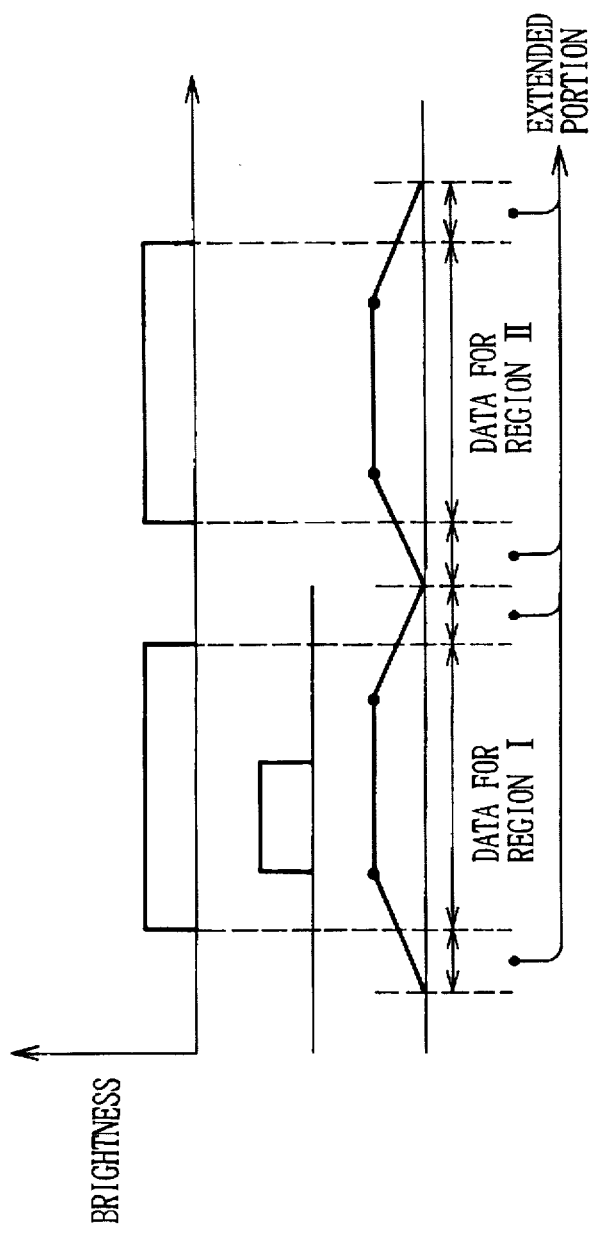
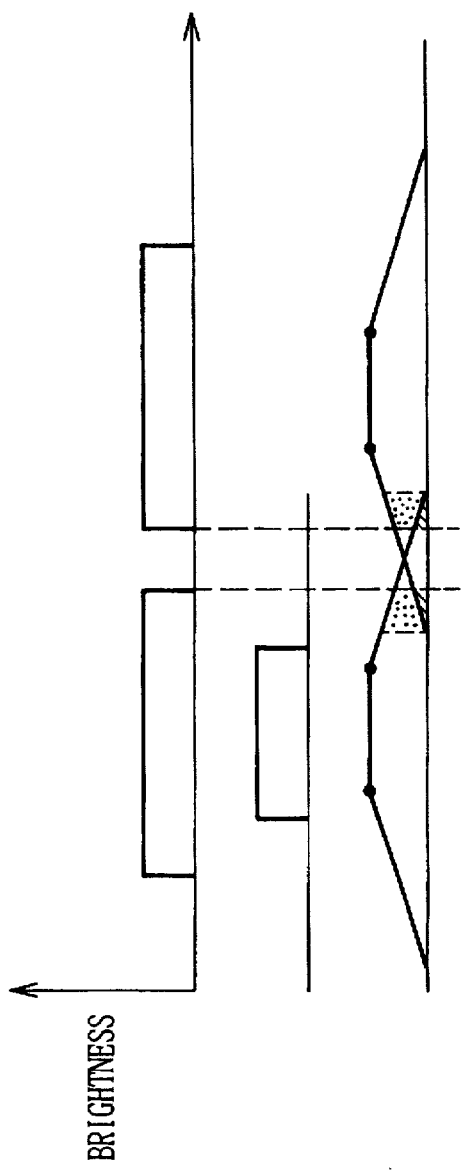
Fig.3A
Fig.3B
Fig.3C
Fig.4A
Fig.4B
Fig.4C

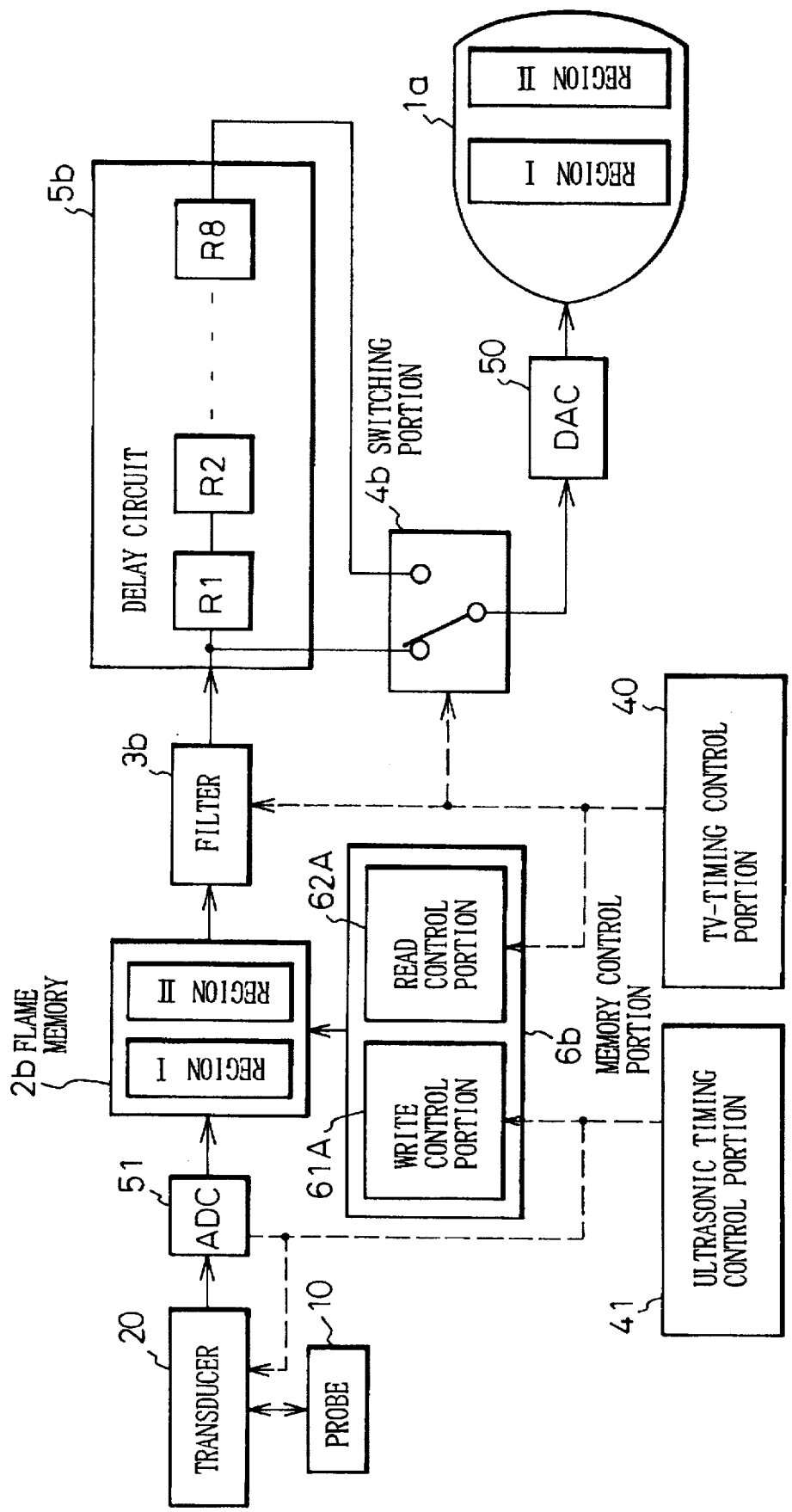

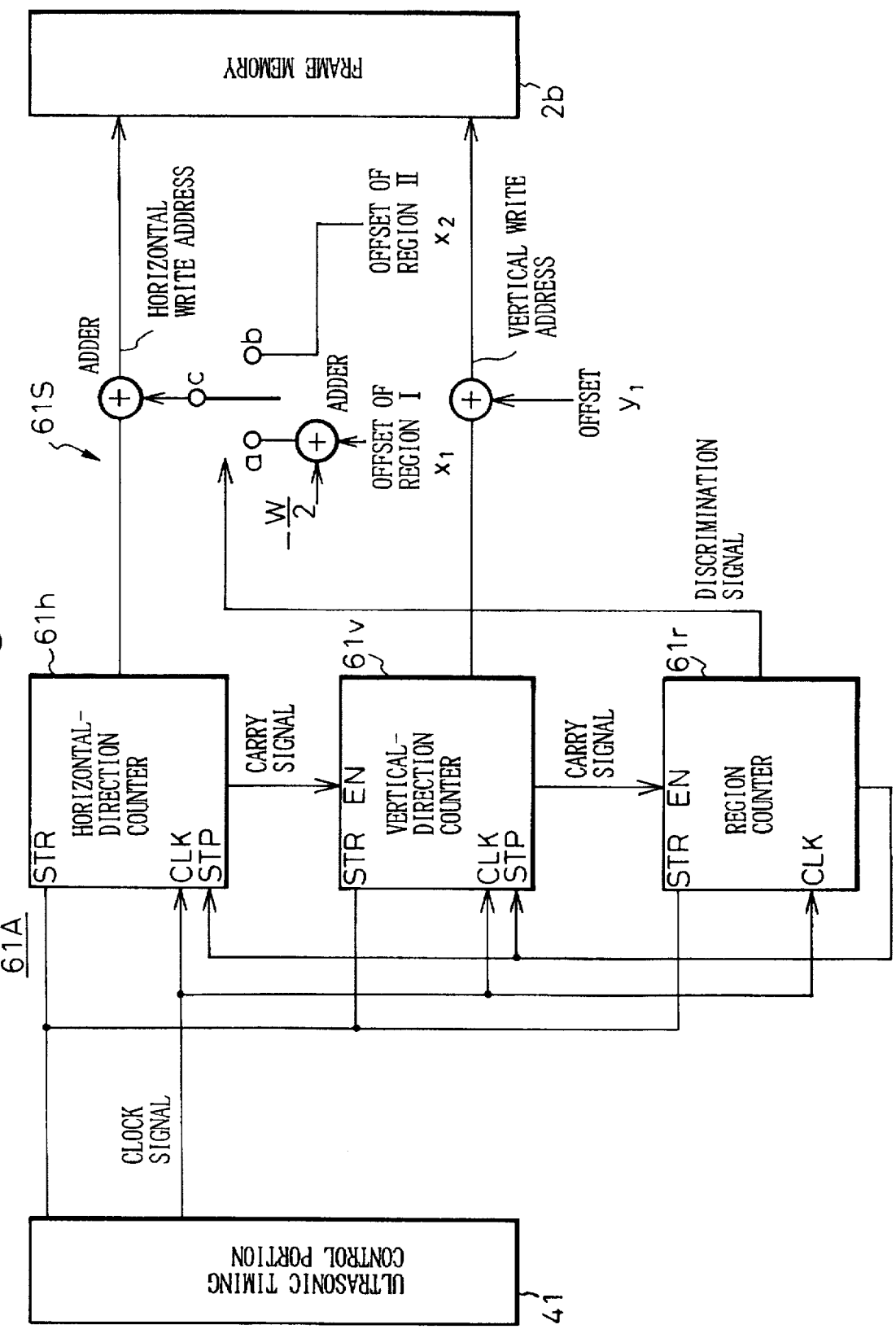

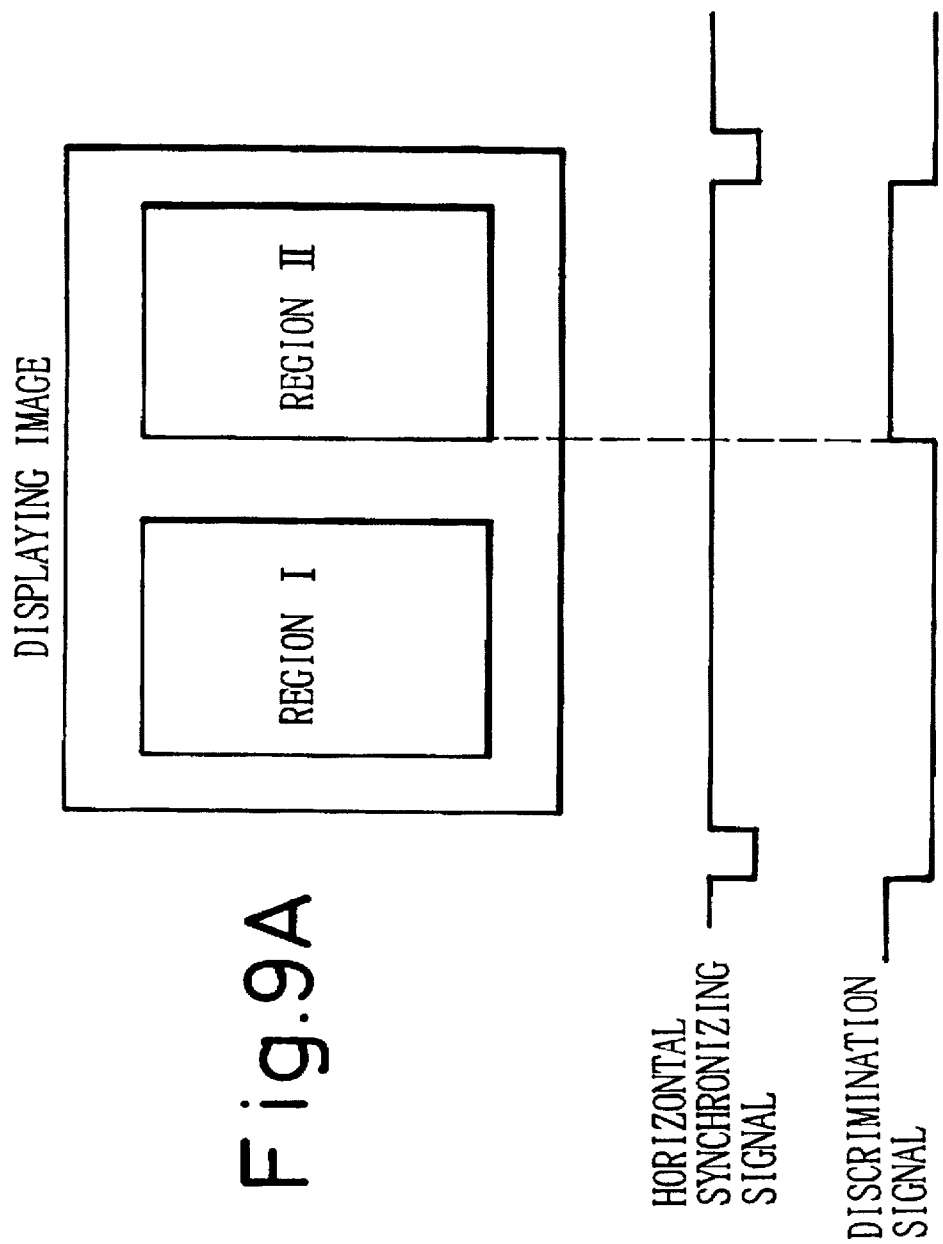

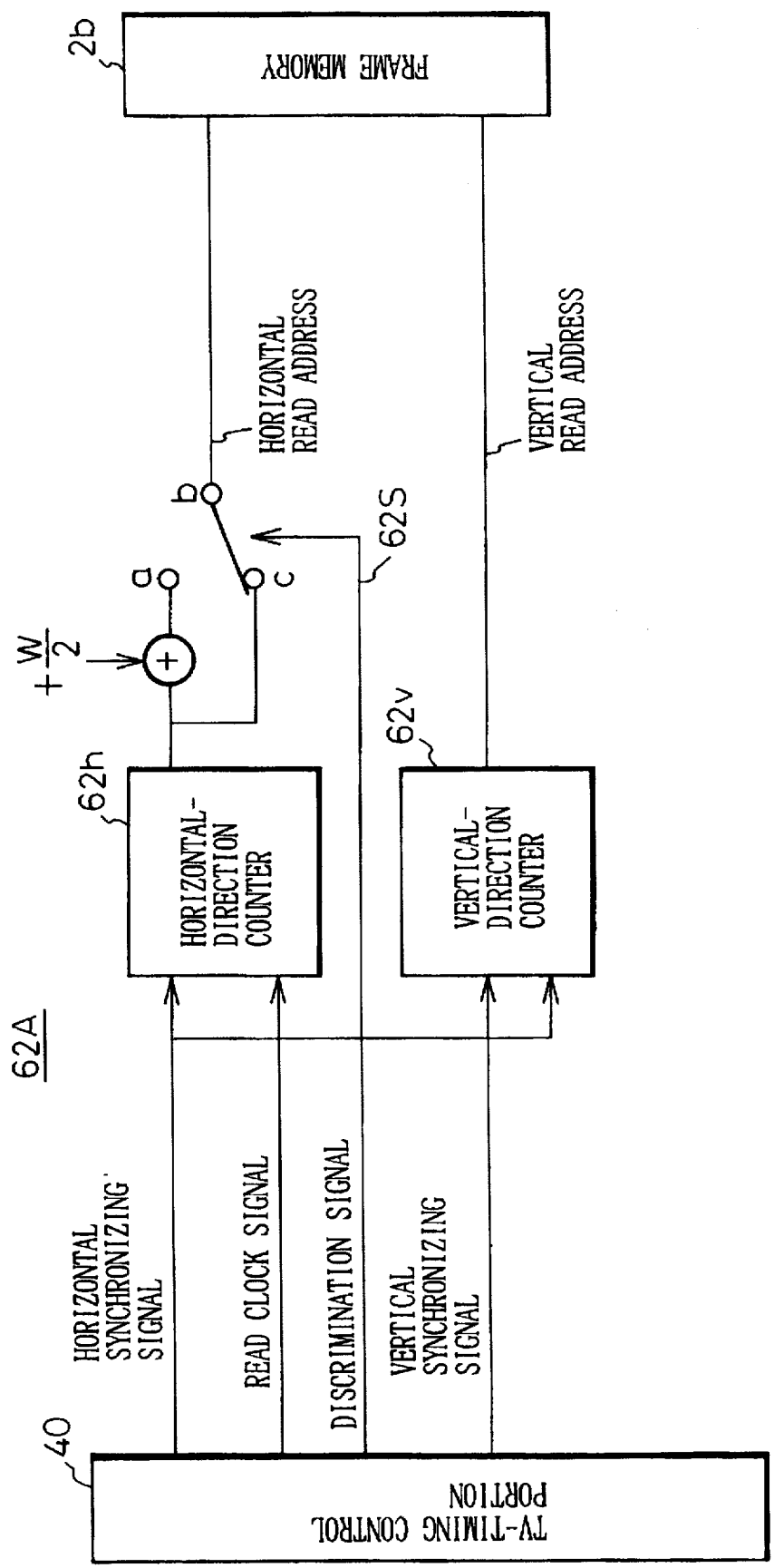

METHOD AND APPARATUS FOR DISPLAYING A PLURALITY OF IMAGES ON ONE DISPLAY IMAGE BY CARRYING OUT FILTERING OPERATION

BACKGROUND OF THE INVENTION

1. Field of the Invention

The present invention relates to a method and apparatus for displaying a plurality of images on one display image, more particularly, to a method and apparatus for displaying a plurality of image data adjacently and along a horizontal direction, and the plurality of image data are processed by an image processing operation such as filtering.

2. Description of the Related Art

In various technical arts using a computer to carry out information processing, the processed results are simultaneously arranged and displayed as a plurality of images on a display portion. For example, in an ultrasonic diagnostic device of a medical art, when converting ultrasonic signals reflected from a checkup object (ROI: region of interest of a human body, e.g., a heart of a human body) into image data and displaying the checkup object as an image, it is generally carried out in such a way that two relational images, e.g., two diagnostic portions having different depths or same diagnostic portion at different times, are simultaneously displayed on a display device in order to observe differences, transitional degree, or changes.

Further, for example, analog signals input from external device such as ultrasonic signal input devices to the ultrasonic diagnostic device include noise components, the analog signals are digitalized, and the digital signals are processed, by passing through a filter, to eliminate the noise components therefrom. In such image processing, an intervention may be caused between two adjacent images, or interventions of an image, a brightness, or a color at a boundary line between the adjacent images.

SUMMARY OF THE INVENTION

An object of the present invention is to provide a method and apparatus enabled to display an image where an intervention of data does not appear at a region between adjacent display-regions, when applying a filtering operation having a broad Kernel-width to display data. A Kernel-width denotes a reference length or a reference time of a filtering operation.

According to the present invention, there is provided an image display apparatus for displaying a plurality of images on one display image, by carrying out a filtering operation, comprising a memory unit for writing, storing and reading display data having a plurality of display-regions along a display scanning direction in one display image of a display unit; a filter unit, connected to the memory unit, for applying a filtering operation to the display data read out from the memory unit along the display scanning direction; a write control unit, connected to the memory unit, for controlling the writing of the display data at a region having a specific address length between adjacent display-regions, when storing the display data into the memory unit; a delay unit, connected to the filter unit, for giving a different delay value to the display data output from the filter unit; and a switching unit, connected to the filter unit and the delay unit, for switching the display data having a different delay value output from the delay unit at a boundary line of the adjacent display-regions.

The write control unit may write the display data at a region having a specific address length longer than at least a half of the Kernel-width of the filtering operation of the filter unit, when storing the display data into the memory unit.

According to the present invention, there is also provided an image display apparatus for displaying a plurality of images on one display image by carrying out a filtering operation comprising a memory unit for storing display data having a plurality of display-regions along a display scanning direction in one display image of a display unit; a filter unit, connected to the memory unit, for applying a filtering operation to the display data read out from the memory unit along the display scanning direction; a read control unit, connected to the memory unit, for controlling the reading of the display data at a region having a specific time length between adjacent display-regions, when reading the display data from the memory unit; a delay unit, connected to the filter unit, for giving a different delay value to the display data output from the filter unit; and a switching unit, connected to the filter unit and the delay unit, for switching the display data having a different delay value output from the delay unit at a boundary line of the adjacent display-regions.

The read control unit may read the display data from a region having a specific time length longer than at least a half of the Kernel-width of the filtering operation of the filter unit, when reading the display data from the memory unit.

The filter unit may carry out a filtering operation based on a moving-average. The display data may comprise a plurality of data components, and the filter units, the delay units, and the switching units may be provided for each of the data components, respectively. The filtering characteristics of the filter units may be changed in accordance with the data components.

The image display apparatus may further comprise a look-up table, connected to each of the switching units, for outputting a plurality of color data based on the data components. The image display apparatus may be an ultrasonic diagnostic apparatus having a Doppler-analysis unit, the data components may be scattering data and flowing-speed data, and the Doppler-analysis unit may be used to divide the display data output from a transducer into the scattering data and the flowing-speed data.

Further, according to the present invention, there is provided an image display method for displaying a plurality of display-regions along a display scanning direction in one display image of a display unit, wherein the image display method comprises the steps of controlling to write display data having a plurality of display-regions along a display scanning direction in one display image of a display unit, and storing the display data to a memory unit at a region having a specific address length between adjacent display-regions; applying a filtering operation to the display data read out from the memory unit along the display scanning direction; giving a different delay value to the display data applied by the filtering operation; and switching the display data having a different delay value at a boundary line of the adjacent display-regions.

The display data may be written into the memory unit at a region having a specific address length longer than at least a half of the Kernel-width of the filtering operation.

Further, according to the present invention, there is also provided an image display method for displaying a plurality of display-regions along a display scanning direction in one display image of a display unit, wherein the image display method comprises the steps of storing display data having a plurality of display-regions along a display scanning direction in one display image of a display unit; controlling the reading of the display data from the memory unit as a region having a specific time length between adjacent display-regions; applying a filtering operation to the display data read out from the memory unit along the display scanning direction; giving a different delay value to the display data applied by the filtering operation; and switching the display data having a different delay value at a boundary line of the adjacent display-regions.

The display data may be read from the memory unit as a region having a specific address length longer than at least a half of the Kernel-width of the filtering operation. The filtering operation may be carried out based on a moving-average.

BRIEF DESCRIPTION OF THE DRAWINGS

The present invention will be more clearly understood from the description of the preferred embodiments as set forth below with reference to the accompanying drawings, wherein:

FIGS. 3A to 3C are diagrams for explaining an operation of the image display apparatus according to the prior art (part 1);

FIGS. 4A to 4C are diagrams for explaining an operation of the image display apparatus according to the prior art (part 2);

FIG. 7 is a block diagram showing an embodiment of an image display apparatus according to the present invention;

FIG. 8 is a functional block diagram showing a write control portion of the image display apparatus shown in FIG. 7;

FIGS. 9A to 9C are diagrams for explaining an operation of a TV-system in the image display apparatus shown in FIG. 7;

FIG. 12 is a functional block diagram showing a read control portion of the image display apparatus shown in FIG. 7;

DESCRIPTION OF THE PREFERRED EMBODIMENTS

For a better understanding of the preferred embodiments, the problems of the related art will be explained, with reference to FIGS. 1 to 5.

Figure 1:
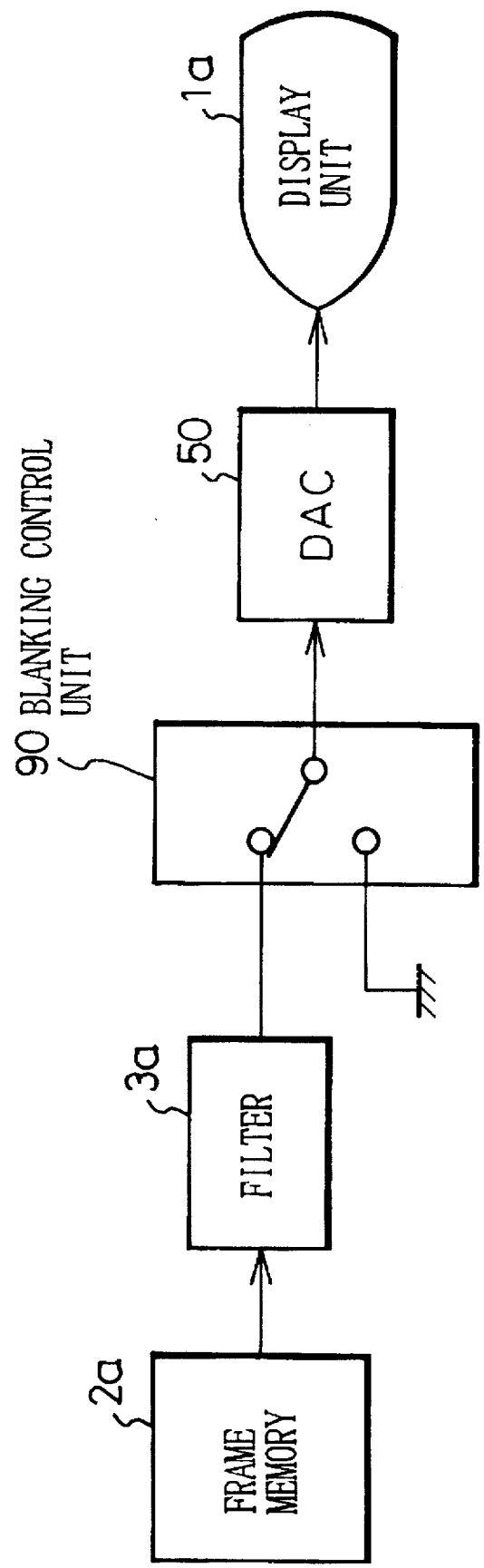
FIG. 1 is a block diagram showing an example of an image display apparatus according to the prior art.

FIG. 1 shows an example of an image display apparatus according to the prior art. In FIG. 1 reference $2a$ denotes a frame memory, $3a$ denotes a filter, 90 denotes a blanking control unit, 50 denotes a digital-to-analog converter (DAC), and $1a$ denotes a display unit.

As shown in FIG. 1, image data of regions read out from the frame memory 2 are processed by a filtering operation in the filter $3a$, and the image data are converted from analog signals to digital signals by the DAC 50 and displayed on the display portion $1a$. Note, the filtering operation is, for example, carried out due to a moving-average.

Figure 2:
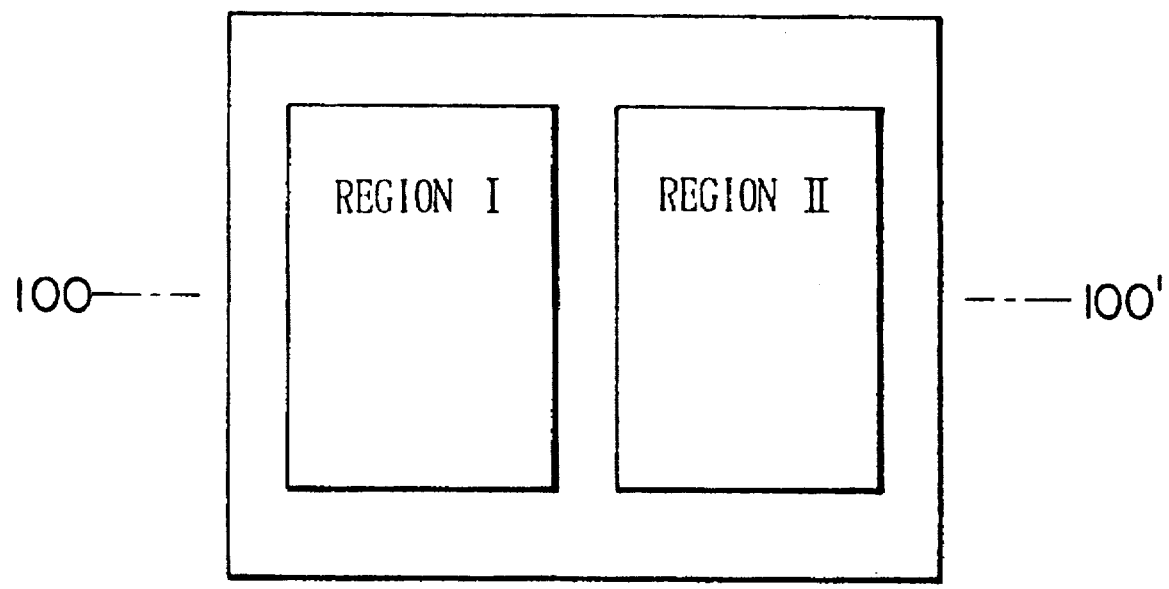
FIG. 2 is a diagram for explaining the case of displaying two images on a display image.

FIG. 2 shows the case of displaying two images on a display image. As shown in FIG. 2, an image is divided into two regions of right and left, and two different images are displayed on the two divided regions (regions I and II), which is conventionally and broadly carried out in the prior art. For example, in an ultrasonic wave diagnostic device of a medical art, two images of the same portion of a checkup object (for example, a heart of a human body) detected at different times or two images of different portions of the checkup object are displayed on the two adjacent regions (divided regions) enabling an operator (medical doctor) to clearly detect the difference thereof and easily make a diagnosis.

In order to decrease or delete unnecessary noise caused by the changes in the object of an ultrasonic diagnosis, such as breathing, a filtering operation based on a moving-average (which will be described after with reference to FIG. 5) is generally used.

FIGS. 3A to 3C show an operation of the image display apparatus according to the prior art (part 1), and FIGS. 4A to 4C show an operation of the image display apparatus according to the prior art (part 2).

FIG. 3A shows brightness data on one scanning line 100-100' in FIG. 2, and FIG. 3B shows a Kernel (Kernel-width) of the moving-average. Further, FIG. 3C shows the result obtained by carrying out the filtering operations due to the moving-average using the Kernel shown in FIG. 3B. Note, the Kernel (Kernel-width) denotes a reference length or a reference time of a filtering operation. Namely, the Kernel-width corresponds to the time determined by reading out or scanning the specific number of pixels (specific length of data) included in a spatial filter (or one filtering operation). Further, the Kernel-width also corresponds to the length determined by reading out or scanning the specific number of pixels included in a spatial filter.

Note, in FIGS. 3A to 3C and 4A to 4C, the moving-average is obtained by carrying out an arithmetical mean of all pixels included in a Kernel-width, so that a value of the pixel positioned at the center of the Kernel-width is obtained.

Figure 5:
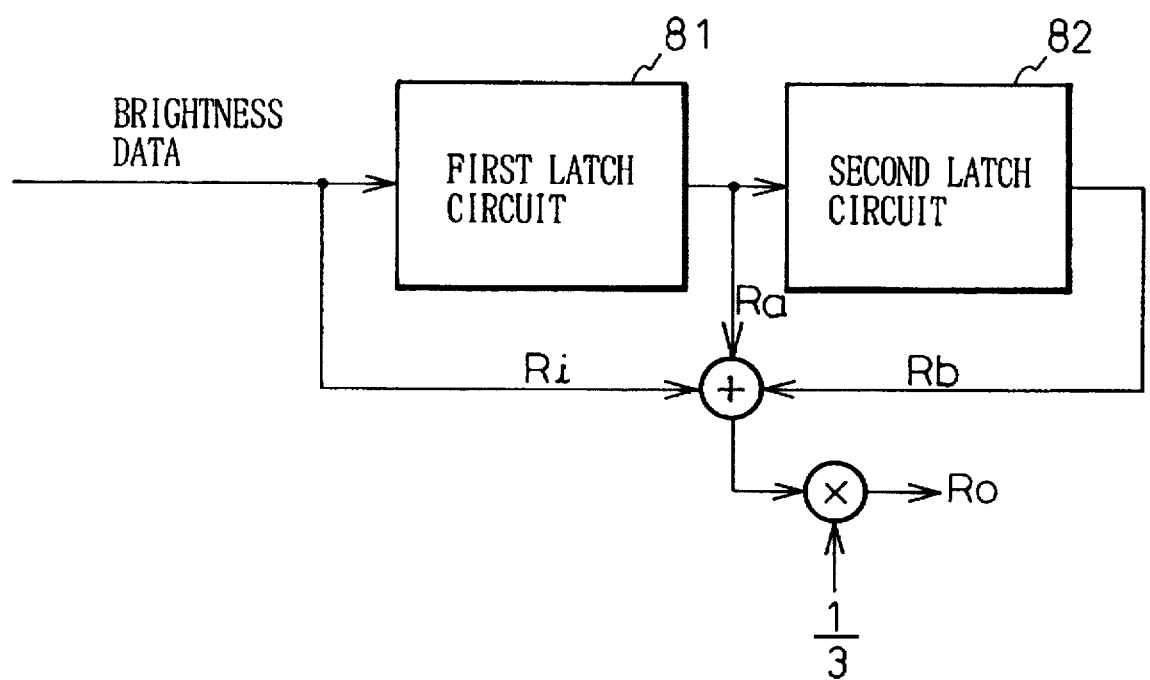
FIG. 5 is a diagram for explaining a filtering operation based on a moving-average.

FIG. 5 shows a filtering operation based on a moving-average. Namely, FIG. 5 is an explanatory diagram for explaining a moving-average operation, when the Kernel-width is specified to a length corresponding to three pixels and the brightness data are specified by a two-bit digital signal.

The input brightness data Ri corresponding to each of the pixels are successively shifted to first and second latch circuits 81 and 82, and data Ra and Rb are output from these latch circuits, respectively. Therefore, the brightness data Ro of the pixel positioned at the center of the moving Kernel are obtained by the arithmetical mean of the data Ri, Ra, and Rb, which is indicated by the following equation:

$$(Ri+Ra+Rb) \div 3$$

Practically, instead of simply carrying out the processing for the arithmetical mean, significants are added to the pixels included in the Kernel-width (for example, a larger significant value is added to the pixel positioned closer to the center of the Kernel-width) and the pixels including the significants are summed, and then the total value is divided by the number of the pixels included in the Kernel-width, so that a value of the pixel positioned at the center of the Kernel-width is obtained. This method for obtaining the value of the center pixel of the Kernel-width is generally applied.

In the above descriptions, as shown in FIG. 3C, the displayed image processed by the filtering operation does not cause a mutual intervention of adjacent display-regions, when the length between the adjacent display-regions is sufficiently long. Nevertheless, the size of images to be displayed on the display-regions cannot be specified to be large, as the distance between the adjacent display-regions must be sufficient large. Therefore, a diagnosis cannot be easily carried out.

As shown in FIG. 2, when displaying two display images on the adjacent display-regions having a preferable length therebetween to easily carry out the diagnosis, a blurred portion (indistinct area) corresponding to a half of the Kernel-width based on the moving-average may be caused on both sides of a boundary region of the adjacent display-regions, and further extended portions (hatched portions) may appear on the both sides of the boundary region, as shown in FIG. 4C.

Note, as shown in FIG. 1, in the prior art, the extended portions are eliminated by a blanking processing for positively disabling the displaying of the extended portions, or the extended portions are eliminated by only moving an electron beam in a raster scan operation of a television (TV). Namely, in FIG. 1, the blanking control portion 90 generally controls the selection of display data processed by the filtering operation of a filter 3a, and outputs the display data to the display portion 1a. On the other hand, the blanking control portion 90 controls to select a low level (an earth) to carry out the blanking processing at the boundary region of the adjacent display-regions corresponding to the extended portions.

In the prior art image display apparatus as described above, when the Kernel-width of a moving-average is longer than two times the distance between regions (display-regions) I and II shown in FIG. 2, data from both regions vise with each other, and the influence appears on both display-regions shown by the hatched portions in FIG. 4C. As described above, in the prior art, the extended portions are eliminated by a blanking method (blanking control unit 90) for carrying out a blanking processing at the extended portions. However, the intervention portions cannot be removed by the blanking method. If the intervention portions are removed by using the blanking method, the data of the original area (dotted portions shown in FIG. 4C) are also removed.

Next, a principle configuration of the present invention will be explained with reference to FIG. 6.

Figure 6:
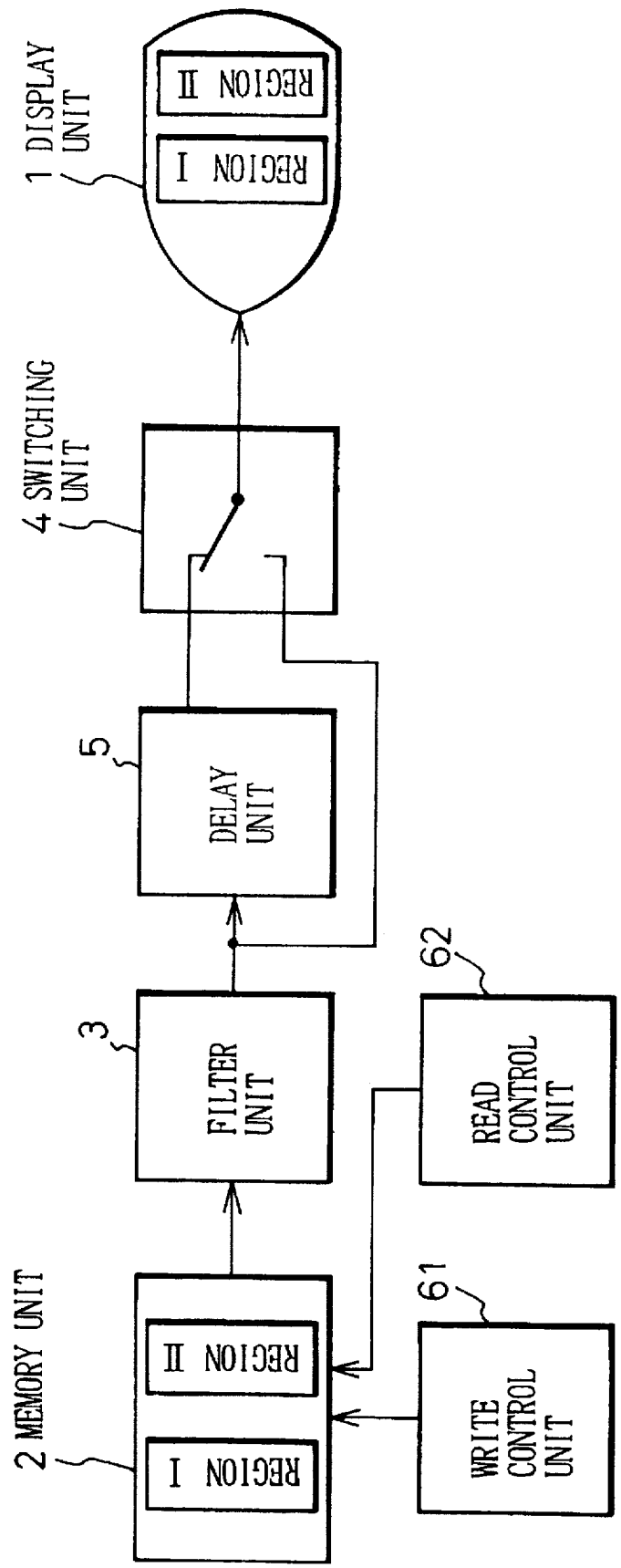
FIG. 6 is a block diagram showing a principle configuration of an image displaying apparatus according to the present invention.

FIG. 6 shows a principle configuration of an image displaying apparatus according to the present invention. In FIG. 6, reference numeral 1 denotes a display unit, 2 denotes a memory unit for writing, storing and reading display data having a plurality of display-regions (regions I, II) along a display scanning direction in one display image of the display unit 1, and 3 denotes a filter unit for applying a filtering operation to the display data read out from the memory unit 2 along the display scanning direction.

Further, reference numeral 61 denotes a write control unit to control writing the display data at a region having a specific address length between adjacent display-regions, when storing the display data into the memory unit 2, and 62 denotes a read control unit to control reading the display data from a region having a specific time length between adjacent display-regions, when reading the display data from the memory unit 2. Note, each image display method according to the present invention requires one of the write control unit 61 and the read control unit 62.

Furthermore, reference numeral 5 denotes a delay unit for giving a different delay value to the display data output from the filter unit 3, and 4 denotes a switching unit for switching the display data having a different delay value output from the delay unit 5 at a boundary line of the adjacent display-regions.

The memory unit 2 is used to write, store and read display data having a plurality of display-regions (regions I, II) along a display scanning direction in one display image of the display unit 1, and the filter unit 3 is used to apply a filtering operation to the display data read out from the memory unit 2 along the display scanning direction. Therefore, a plurality of display-regions are displayed on the display unit 1 by applying outputs of the filter unit 3 to the display unit 1.

The write control unit 61 controls the writing of display data at a region having a specific address length between adjacent display-regions, when storing the display data into the memory unit 2, and the stored data is read from the memory unit 2 and supplied to the filter unit 3.

On the other hand, the read control unit 62 controls the reading of the display data from a region having a specific time length between adjacent display-regions, when reading the display data from the memory unit 2. In this case, the data is directly written and stored to the memory unit 2 without being processed by the write control unit 61.

The delay unit 5 gives a different delay value to the display data output from the filter unit 3, and the switching unit 4 switches the display data having a different delay value output from the delay unit 5 at a boundary line of the adjacent display-regions. Namely, the display data is stored into the memory unit 2 at a region having a specific address length between adjacent display-regions by the write control unit 61, and thus the display data having the specific address length between adjacent display-regions is read out from the memory unit 2 and input to the filter unit 3, when reading out the display data from the memory unit 2.

On the other hand, the display data is read from the memory unit 2 on a specific time length between adjacent display-regions by the read control unit 62, and thus the display data having the specific time length between adjacent display-regions is read out from the memory unit 2 and input to the filter unit 3. Therefore, the display data are input to the delay unit 5 without receiving the benefit of the mutual intervention of the adjacent display-regions caused by the filter unit 3. The switching unit 4 switches the display data having a different delay value output from the delay unit 5 at a boundary line of the adjacent display-regions, so that the display data having a preferable length between the adjacent display-regions can be displayed on the display unit 1.

Below, the preferred embodiments of an image display apparatus according to the present invention will be explained, with reference to the accompanying drawings. Note, in all of the drawings, the same reference numerals denote the same portions or similar configurations.

FIG. 7 shows an embodiment of an image display apparatus according to the present invention. In FIG. 7, reference numeral 1a denotes a display portion, 2b denotes a frame memory, 3b denotes a filter, 4b denotes a switching portion, and 5b denotes a delay circuit. Further, reference 10 denotes a probe, 20 denotes a transducer, 51 denotes an analog-to-digital converter (ADC), and 50 denotes a digital-to analog converter (DAC). In addition, reference numeral 6b denotes a memory control portion having a write control portion 61A and a read control portion 62A, 40 denotes a TV-timing control portion, and 41 denotes an ultrasonic timing control portion.

As shown in FIG. 7, the transducer 20 drives the probe 10 for emitting ultrasonic waves into an object (ROI: region of interest of a human body, e.g., a heart of a human body), produces electrical signals in response to reflected waves from the object, and outputs analog signals by carrying out an amplifying process or the other processes to the electrical signals. The ADC 51 converts the analog signals output from the transducer 20 to digital signals in accordance with sampling clock signals from the ultrasonic timing control portion 41, and output ultrasonic image data. The frame memory 2b is memory for storing image data where each pixel of a display portion 1a corresponds to a position in the memory defined by horizontal and vertical memory addresses, and stores the ultrasonic image data output from the ADC 51 as image data.

The memory control portion 6b includes the write control portion 61A and the read control portion 62A. These write and read control portions 61A and 62A generate an address signal and memory control signal in accordance with the TV-timing control portion 40 and the timing control portion for ultrasonic waves 41, and writes/reads the ultrasonic receiving data/image data to/from the frame memory 2b (which will be described in later).

The ultrasonic timing control portion 41 carries out timing control for generating the ultrasonic signals and receiving the reflected signals from the examined object, through the transducer 20, for converting the signal by the ADC 51, and for writing to the frame memory by the write control portion 61A. The TV-timing control portion 40 carries out timing control of reading from the frame memory 2b by the read control portion 62A, for obtaining a moving average by the filter 3b, and for switching by the switching portion 4b. The filter 3b removes a noise from image data. Namely, analog image data, which includes noise, are input from the ultrasonic probe 10, the analog image data including the noise are input to the transducer 20 and are converted to digital signals, and the noise is removed from the digital image data by applying a moving average process.

The delay circuit 5b comprises a multistage register (for example, eight-stage register R1, R2, ..., R8), and an output of the filter 3b is input to the delay circuit 5b and delayed by the shifting operation of the delay circuit 5b. The output of the filter 3b and an output of the delay circuit 5b (for example, the register R8) are input to the switching portion 4b, and the outputs of the filter 3b and delay circuit 5b are switched and output in accordance with a reading region discrimination signal (refer to FIGS. 9A to 9C) output from the TV-timing control portion 40. The DAC 50 convert the digital image data output from the switching portion 4b to an analog signal and output to the display portion (for example, television or TV) 1a.

Below, the function of the write control portion 61A will be explained with reference to the embodiment shown in FIG. 7. Further, the case when displaying regions I and II having the same size on fixed positions of the display portion 1a will be explained.

FIG. 8 shows the write control portion 61A of the image display apparatus shown in FIG. 7. Note, references $x_1$ and $x_2$ denote offsets from the left side of a displayed image to the regions I and II, and references $y_1$ and $y_2$ denote offsets from the upper side of a displayed image to the regions I and II, respectively.

Figure 10A:
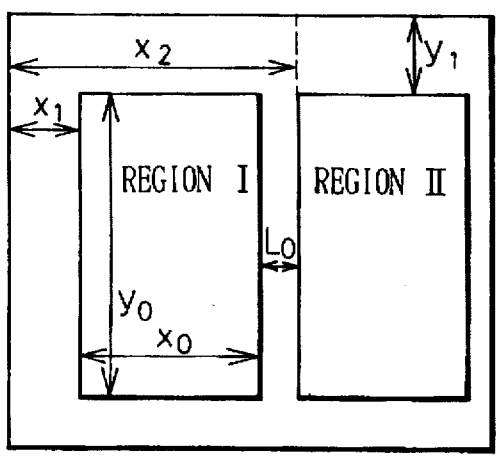
FIGS. 10A to 10E are diagrams for explaining an operation of the image display apparatus shown in FIG. 7.
Figure 10B:
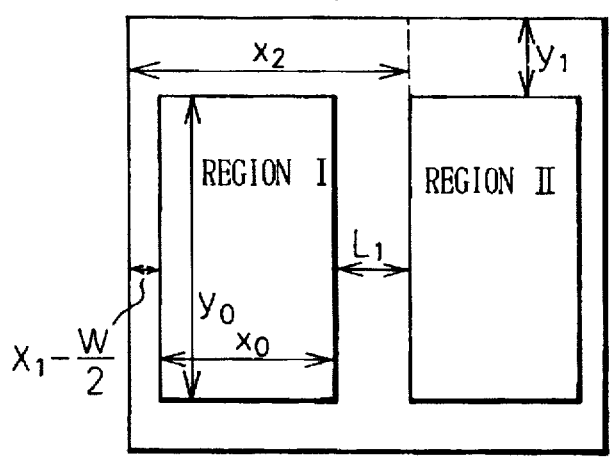
Figure 10C:
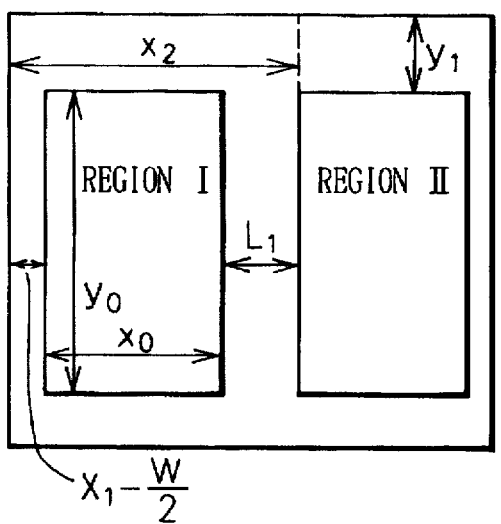
Figure 10D:
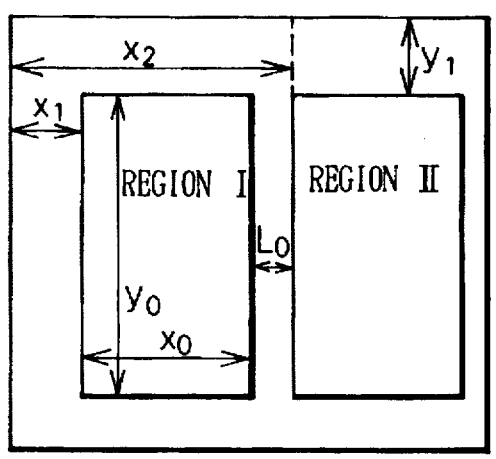

FIGS. 9A to 9C are diagrams for explaining the operation of a TV-system in the image display system shown in FIG. 7. FIGS. 10A to 10E show an operation of the image display apparatus shown in FIG. 7 by using the write control portion 61A. Note, FIG. 10A shows original image data output from the transducer 20, FIG. 10B shows image data processed by the write control portion 61A and stored in the frame memory 2b, FIG. 10C shows image data read from the frame memory 2b and input to the filter 3b, and FIG. 10D shows image data output from the switching portion 4b corresponding to a display image to be displayed on the display portion 1a.

As shown in FIG. 8, the write control portion 61A includes a horizontal-direction counter 61h, a vertical-direction counter 61v, and region counter 61r, and the write control portion 61A generates write addresses of horizontal-direction and vertical-direction and supplied them to the frame memory 2b. These three counters 61h, 61v, and 61r renew discrete values in accordance with a clock signal and a start signal indicating a breakpoint of one scanning operation output from the ultrasonic timing control portion 41.

The horizontal-direction counter 61h counts the clock signal, for example, counts the clock signal up to a value ($x_0$) corresponding to the number of pixels included in one scanning line in horizontal-direction, the discrete value is cleared, and a carry signal is generated. The vertical-direction counter 61v counts the carry signal output from the horizontal-direction counter 61h, for example, counts the carry signal up to a value ($y_0$) corresponding to the number of pixels in vertical-direction, the discrete value is cleared, and a carry signal is generated.

Figure 10E:
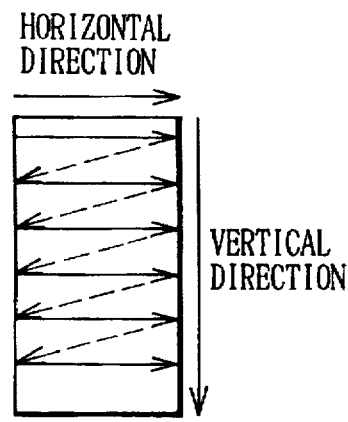

For example, an address space corresponding to the region shown in FIG. 10E are scanned by the horizontal-direction counter 61h in the horizontal-direction and by the vertical-direction counter 61v in the vertical-direction. The region counter 61r counts the number of the regions by counting the carry signal output from the vertical-direction counter 61v, and outputs the reading region discrimination signal.

As shown in FIG. 8, an address conversion portion 61s switches and selects an addition value to be added to the discrete value of the horizontal-direction counter 61h in accordance with the reading region discrimination signal output from the region counter 61r. For example, when the reading region discrimination signal points out the region I, contacts c and a of a selector (which is shown as a switch to be easily understood) are connected, and a horizontal write address, which is shown by the following equation, is output.

$x_1$+(discrete value of horizontal-direction counter 61h)+(−W/2)

Therefore, when displaying the regions I and II on the display portion shown in FIG. 10D, the image data of the region I are shifted by W/2 to a left and stored in the frame memory 2b as shown in FIG. 10B.

Note, reference W denotes a Kernel-width. Further, when the reading region discrimination signal points out the region II, contacts c and b of the selector are connected, and a horizontal write address, which is shown by the following equation, is output.

$x_2$+(discrete value of horizontal-direction counter 61h)

On the other hand, an offset $y_1$ is added to the discrete value of the vertical-direction counter 61v, and is output as a vertical write address.

Namely, original image data (shown in FIG. 10A) output from the transducer 20 are supplied from the transducer 20 to the frame memory 2b through the ADC 51, and the above described processing for the horizontal and vertical write addresses is applied by the write control portion 61A. Further, image data (shown in FIG. 10B) processed by the write control portion 61A is written and stored in the frame memory 2b. Note, for example, the distance $L_0$ between the regions I and II of the original image data is shorter than a half of the Kernel-width, the intervention (shown in FIG. 4C) of the regions I and II is caused when applying the filtering operation to the original image data. However, in this embodiment, the distance $L_0$ between the regions I and II of the original image data is extended to the distance $L_1$ shown in FIG. 10B by the write control portion 61A. Note, the distance $L_1$ between the regions I and II is determined to be longer than half of the Kernel-width.

Further, image data (shown in FIG. 10C), which is the same as that stored in the frame memory 2b, is read out and supplied to the filter 3b. Note, the filtering operation is applied to the image data shown in FIG. 10C, where the distance $L_1$ between the regions I and II is longer than a half of the Kernel-width. Therefore, the intervention of the regions I and II, which is explained with reference to FIG. 4C, is not caused.

In addition, the image data processed by the filtering operation is turned, back into image data (shown in FIG. 10D) by the delay circuit 5b and the switching portion 4b, where the distance $L_0$ between the regions I and II is the same as that of the original image data shown in FIG. 10A. Consequently, the image data shown in FIG. 10D is displayed on the display portion 1a.

Next, mode of operation of the embodiment shown in FIG. 7 will be explained based on FIGS. 11A to 11E. FIGS. 11A to 11E shows an operation of the image display apparatus according to the present invention.

The transducer 20 receives analog ultrasonic receiving data (ultrasonic signal data) from the ultrasonic probe 10, and the analog ultrasonic receiving data are converted to digital ultrasonic receiving data by the ADC 51 and are output to the frame memory 2b. Note, each of the horizontal axes of FIGS. 11A to 11E corresponds to the line A-A' of a display image of the frame memory 2b shown in FIG. 2, each of the vertical axes shows the brightness of each of the pixels positioned on the line A-A', and FIGS. 11A to 11E show the portions corresponding to the regions I and II of the display image having high brightness.

The write control portion 61A of the memory control portion 6b stores the data corresponding to the region I to the frame memory 2b by shifting a half of the Kernel-width to a left direction, when storing the ultrasonic receiving data from the ADC 21 to the frame memory 2b. Namely, the data of the region I are stored in the frame memory 2b at the position shifted to the left direction by a half of the Kernel-width relational to the display image of the region I by connecting the contact c of the address conversion portion 61s to the contact a and generating horizontal write address, which is described in the above with reference to FIGS. 10A to 10D. Note, with regard to the region II, the data of the region I are stored in the frame memory 2b at the same position as that of the display image of the region II shown in FIGS. 10A, by connecting the contact c to the contact b and generating the horizontal write address.

The read control portion 62A outputs the discrete values of the horizontal direction counter 62h and the vertical direction counter 62v as a horizontal read address to the frame memory 2b, when reading the image data written by the write control portion 61A and stored in the frame memory 2b. Therefore, the data of the regions I and II are read from the frame memory 2b with a specific time length corresponding to the address length of the regions I and II stored in the frame memory 2b. Namely, the data of the region I are read from the frame memory 2b by shifting to the left direction by the write control portion 61A, the same as the relationship between the regions I and II of FIGS. 11A and 11B, the data of the region I that were earlier read out at the time of reading from the frame memory 2b than that of writing to the frame memory 2b.

Figures 11A, 11B, 11C, 11D, 11E:
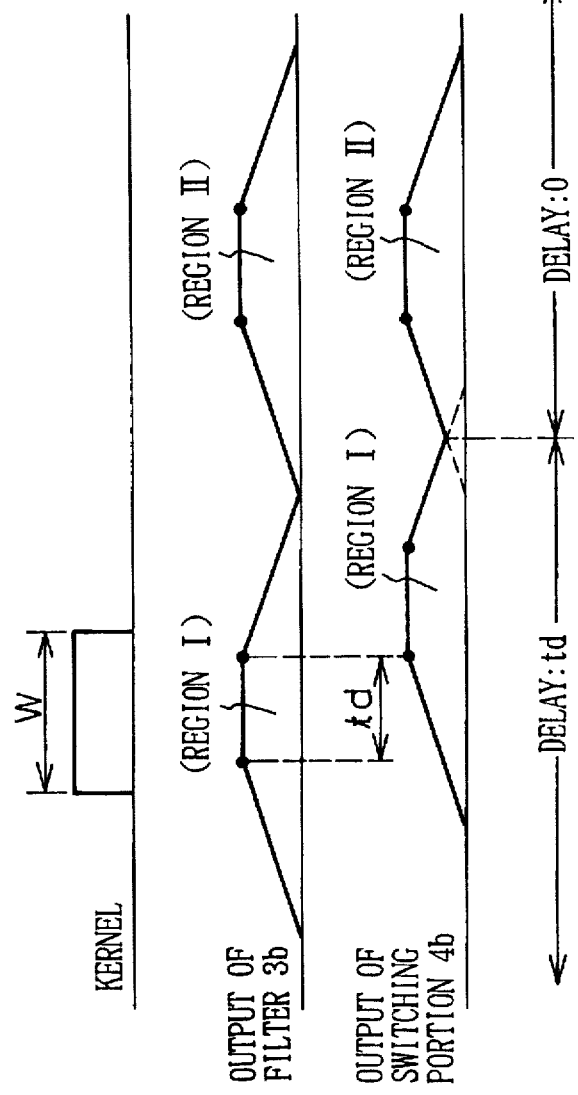
FIGS. 11A to 11E are diagrams for explaining an operation of the image display apparatus according to the present invention.

The filter 3b gives a moving average to the read data, for example, in accordance with the Kernel-width shown in FIG. 11C.

The filter 3b outputs a display image shown in FIG. 11D, and the display image is input to the delay circuit 5b. In the above descriptions, the region I is shifted to the left, and thus an intervention between the regions I and II caused in the prior art (with reference to FIG. 4C) by the moving average is not caused.

The image data input to the delay circuit 5b are shifted by register group R1, R2, ..., R8, and thereby delayed and output by the delaying time td determined by the number of stages of the register group. The switch portion 4b selects the output of the delay circuit 5b (delaying time td) for the data of the region I, and selects the output of the filter 3b (delaying time 0) for the data of the region II. The output of the switch portion 4b is input to the digital-to-analog converter (DAC) 50 and the display portion 1a displays an image having two display regions. As shown in a broken line of FIG. 11E, the switch portion 4b switches the output of the image data (regions I and II) at the time corresponding to the vertex of a triangle, and thus the image data do not overlap and the intervention at the vertex portion can be avoided.

FIG. 12 shows a read control portion of the image display apparatus shown in FIG. 7.

As shown in FIG. 12, the read control portion 62A includes a horizontal-direction counter 62h and a vertical-direction counter 62v, and generates read horizontal-direction and vertical-direction addresses and supplied them to the frame memory 2b in accordance with a timing signal output from the TV-timing control portion 40. Namely, the horizontal-direction counter 62h renews a discrete value in accordance with a clock signal synchronous to a raster scanning of the TV, and the discrete value is cleared in accordance with a horizontal synchronizing signal (with reference to FIGS. 9A to 9C) which is output each time the horizontal raster scanning operation occurs. The vertical-direction counter 62v renews a discrete value in accordance with the horizontal synchronizing signal, the discrete value is cleared in accordance with a vertical synchronizing signal which is output each time the raster scanning operations corresponds to one frame of the display image, and the discrete value is output as a vertical read address.

In one embodiment of an address conversion portion 62s, contacts c and b are connected, and the discrete value of the horizontal-direction counter 62h is always output as a horizontal read address. Nevertheless, in another embodiment which will be explained later, the discrete value of the horizontal-direction counter 62h or a value produced by adding W/2 to the discrete value is selected in accordance with a reading region discrimination signal (refer to FIGS. 9A to 9C) which discriminates the position of the region II to be displayed on the displaying portion, and the selected value is output as a horizontal read address.

As described above, in FIG. 8, when generating the horizontal write address of the region I, the write control portion 61A connects the contact c to the contact a and inhibits the add operation (−W/2) to the discrete value of the horizontal counter 61h, and the data of the regions I and II having the same time space as that shown in FIG. 11A are stored in the frame memory 2b.

On the other hand, in FIG. 12, when generating the horizontal write address of the region I, the read control portion 62A connects the contact c to the contact a and adds the value (W/2) to the discrete value of the horizontal counter 62h, and the data of the region I are read earlier than the data of the region II. Therefore, the data of the regions I and II are read from the frame memory 2b with having the same time space as that shown in FIG. 11B, and thereby the same effect as that of the embodiment explained with reference to FIG. 8 can be obtained.

Figure 13A:
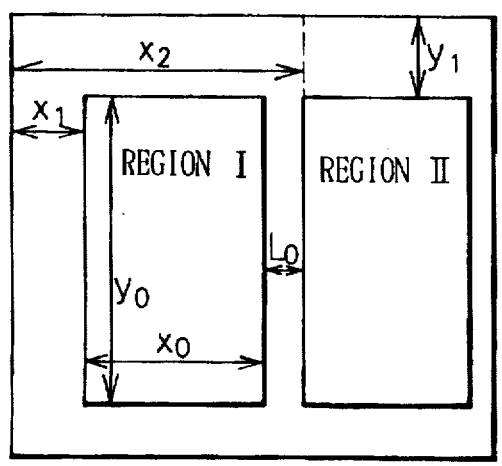
FIGS. 13A to 13E are diagrams for explaining an operation of the image display apparatus shown in FIG. 12.
Figure 13B:
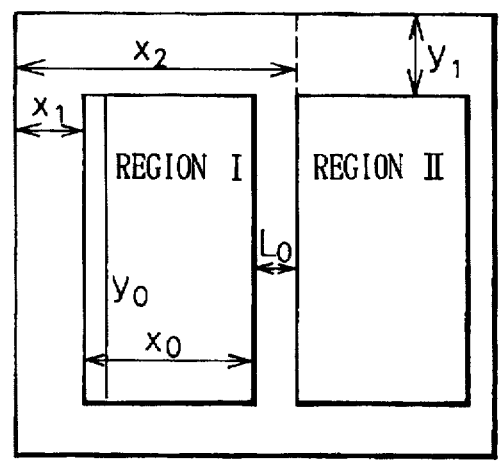
Figure 13C:
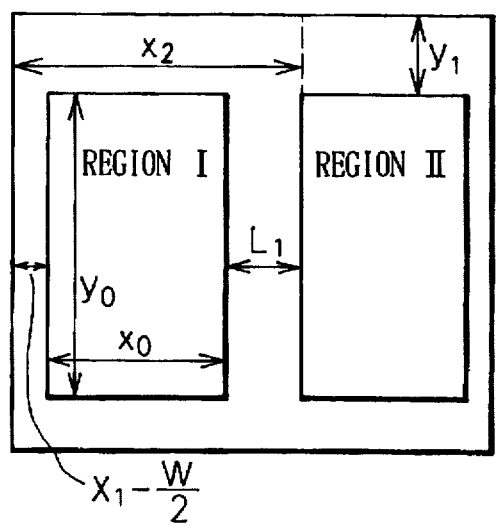
Figure 13D:
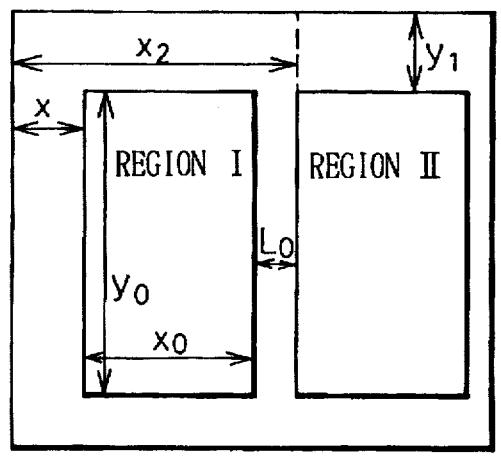
Figure 13E:
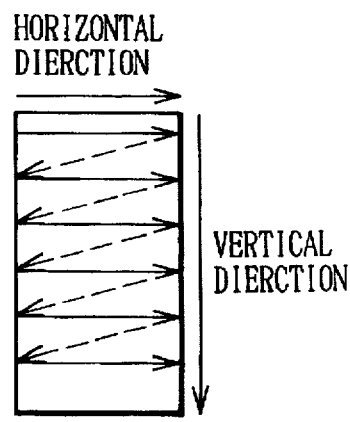

FIGS. 13A to 13E show an operation of the image display apparatus shown in FIG. 7 by using the read control portion 62A. Note, FIG. 13A shows original image data output from the transducer 20, FIG. 13B shows image data stored in the frame memory 2b, FIG. 13C shows image data read from the frame memory 2b, processed by the read control portion 62A and input to the filter 3b, and FIG. 13D shows image data output from the switching portion 4b corresponding to a display image to be displayed on the display portion 1a.

Namely, original image data (shown in FIG. 13A) output from the transducer 20 are supplied from the transducer 20 to the frame memory 2b through the ADC 51, and the image data is written and stored in the frame memory 2b (shown in FIG. 13B).

Further, the image data (shown in FIG. 13B) stored in the frame memory 2b is read out and processed by the read control portion 62A, and the processed image data (shown in FIG. 13C) is supplied to the filter 3b. Note, for example, the distance $L_0$ between the regions I and II of each of the original image data and stored image data (image data stored in the frame memory 2b) is shorter than a half of the Kernel-width, the intervention (shown in FIG. 4C) of the regions I and II is caused when applying the filtering operation to the original image data. However, in this embodiment, the distance $L_0$ between the regions I and II of the stored image data (shown in FIG. 13B) is extended to the distance $L_1$ (shown in FIG. 13C) by the read control portion 61A, when reading the image data from the frame memory 2b. Note, the distance $L_1$ between the regions I and II is determined to be longer than half of the Kernel-width.

Further, the filtering operation is applied to the image data shown in FIG. 13C, where the distance $L_1$ between the regions I and II is longer than a half of the Kernel-width. Therefore, the intervention of the regions I and II, which is explained with reference to FIG. 4C, does not occur.

In addition, the image data processed by the filtering operation is turned back into image data (shown in FIG. 13D) by the delay circuit 5b and the switching portion 4b, where the distance $L_0$ between the regions I and II is the same as that of the original image data shown in FIG. 13A. Consequently, the image data shown in FIG. 13D is displayed on the display portion 1a. Note, FIG. 13E corresponds to FIG. 10E, and the explanation thereof is omitted.

Figure 14A:
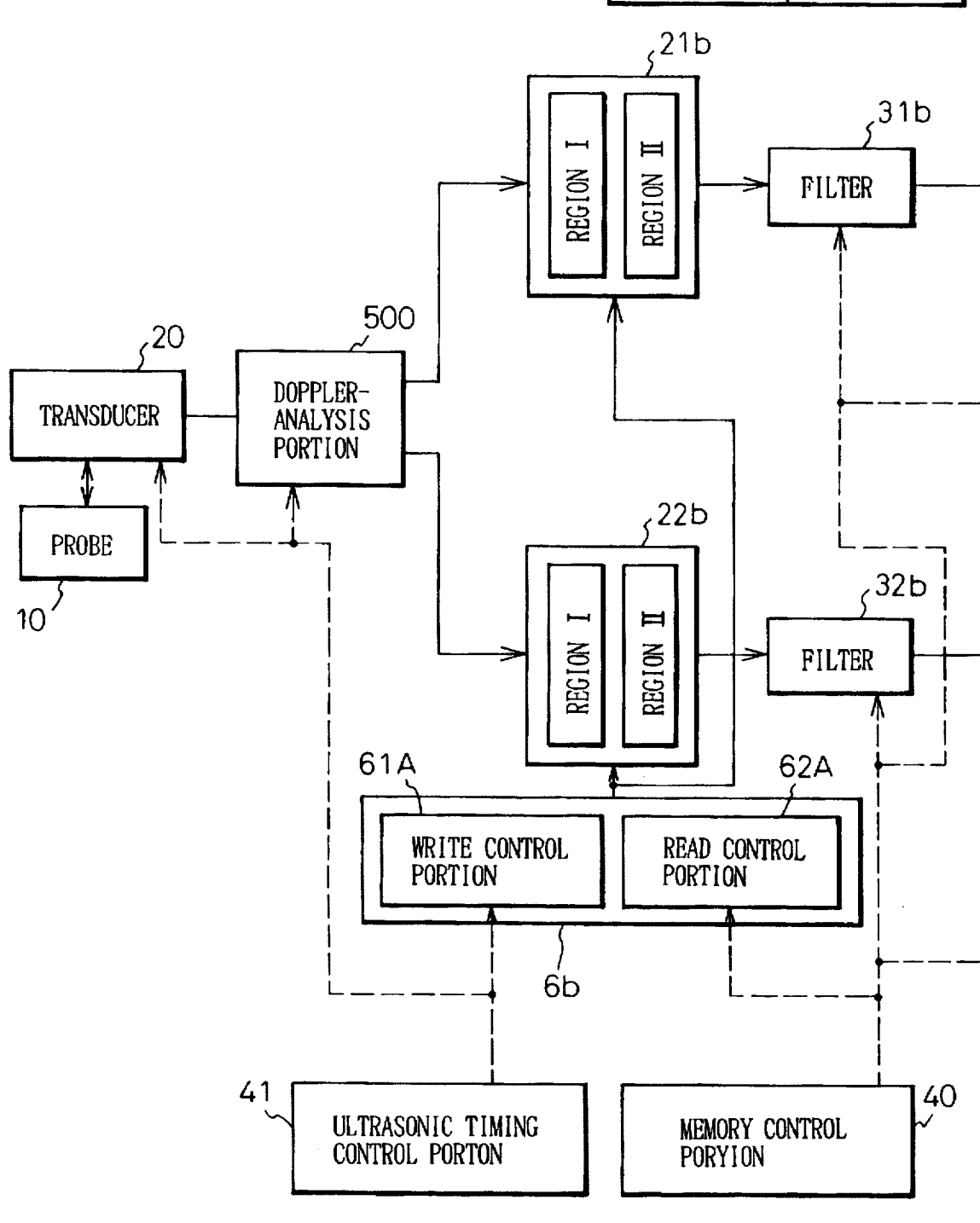
FIG. 14, consisting of FIGS. 14A and 14B, is a block diagram showing another embodiment of an image display apparatus according to the present invention.
Figure 14B:
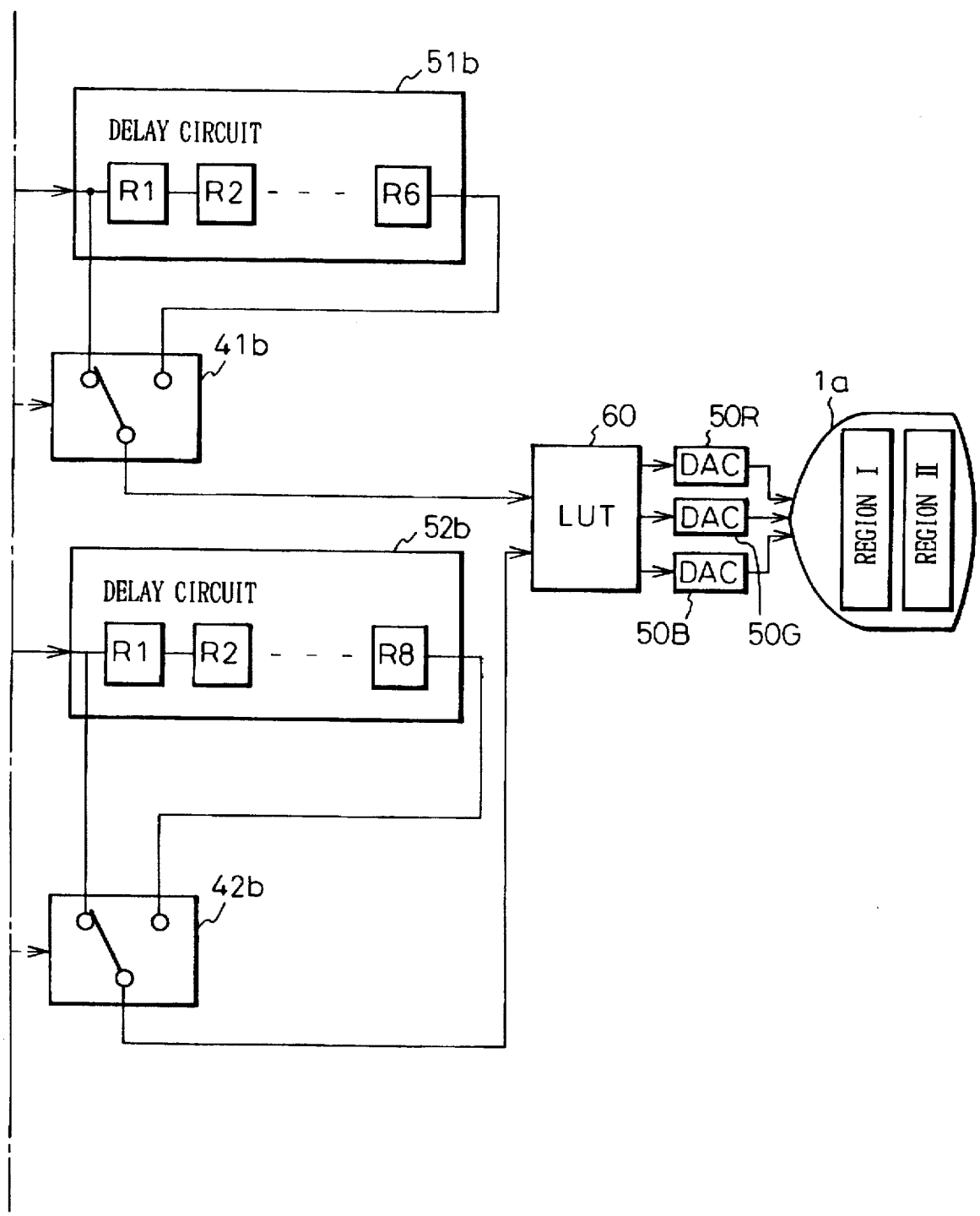

FIG. 14, consisting of FIGS. 14A and 14B, shows another embodiment of an image display apparatus according to the present invention. Note, the image display apparatus shown in FIGS. 14A and 14B is similar to that shown in FIG. 7. Namely, in the image display apparatus of FIGS. 14A and 14B, two groups of frame memories 21b, 22b, filters 31b, 32b, delay circuits 51b, 52b, and switching portions 41b, 42b are provided, and further, a Doppler-analysis portion 500 and a look-up table (LUT) 60 are added thereto.

The Doppler-analysis portion 500 is used to divide the image data (display data) output from the transducer 20 into scattering data (scattering image data) and flowing-speed data (flowing-speed image data). Namely, for example, the image display apparatus is used as an ultrasonic diagnostic apparatus, and the ultrasonic diagnostic apparatus, for example, diagnose a heart of a human body in accordance with the scattering data and flowing speed data of blood located at the heart. The scattering image data and flowing-speed image data, which are data components, are applied to the frame memory 21b and 22b, and the scattering image data and flowing-speed image data stored in the frame memory 21b and 22b are read out and applied to the filters 31b and 32b, respectively.

Note, the scattering image data and flowing-speed image data may be processed by the write control portion 61A and written into the frame memory 21b and 22b, when writing the scattering image data and flowing-speed image data into the frame memory 21b and 22b; or the scattering image data and flowing-speed image data stored in the frame memory 21b and 22b may be processed by the read control portion 62A and applied to the filters 31b and 32b, when reading the scattering image data and flowing-speed image data from the frame memory 21b and 22b.

Further, outputs of the filters 31b and 32b are applied to the LUT 60 through the delay circuits 51b and 52b and switching portions 41b and 42b, respectively. Note, the delay time of the delay circuit 52b is determined to be longer than that of the delay circuit 51b. Further, the operations of the delay circuits 51b and 52b and switching portions 41b and 42b are the same as the delay circuit 5b and switching portion 4b shown in FIG. 7.

The LUT (look-up table) 60 outputs image data of red, green, and blue colors to DACs (digital-to-analog converters) 50R, 50G, and 50B, respectively. Consequently, a color data image having regions I and II, which is based on scattering image data and flowing-speed image data, is displayed on the display portion 1a.

Namely, each pixel of the display image can be constituted by a plurality kinds of data (for example, three primary colors of red, green, and blue colors), and each kind of data can be determined in accordance with various data components (for example, scattering data and flowing-speed data).

As described above, according to the present invention, in an image display apparatus for displaying a plurality of display-regions on an image, the data corresponding to the display-regions having a specific address length between adjacent display-regions are stored in the frame memory and the stored data are read out, or the data corresponding to the display-regions having a specific time length between adjacent display-regions are read from the frame memory, the boundary line between the display-regions input to the filter has a specific time difference, and thus an intervention caused at the region between the adjacent regions by the filtering operation can be avoided. Further, the display data from the filtering operation are input to the delaying circuit, the delay time of the data are switched at the boundary line between the two adjacent regions, and then the data of the region firstly input to the filter are delayed. Therefore, the length between the two regions can be shortened, and an image having a preferable length between the two regions without an intervention can be displayed.

Many different embodiments of the present invention may be constructed without departing from the spirit and scope of the present invention, and it should be understood that the present invention is not limited to the specific embodiments described in this specification, except as defined in the appended claims.

We claim:

1. An image display apparatus for displaying a plurality of images on one display image by carrying out a filtering operation comprising:

memory means for writing, storing and reading display data having a plurality of display-regions along a display scanning direction in one display image of a display;

filter means, connected to said memory means, for applying a filtering operation to the display data read out from said memory means along said display scanning direction;

elongating means, provided at the front portion of said filter means, for elongating the distance between said images in the same scanning line;

write control means, connected to said memory means, for controlling the writing of the display data at a region having a specific address length between adjacent display-regions, when storing the display data into said memory means;

delay means, connected to said filter means, for giving a different delay value to the display data output from said filter means; and switching means, connected to said filter means and said delay means, for switching the display data having a different delay value output from said delay means at a boundary line of said adjacent display-regions, said delay means and said switching means for returning the elongated distance between said images to the previous value being provided at the rear portion of said filter means.

2. An image display apparatus as claimed in claim 1, wherein said write control means writes the display data at a region having a specific address length longer than at least a half of the Kernel-width of the filtering operation of said filter means, when storing the display data into said memory means.

3. An image display apparatus as claimed in claim 1, wherein said filter means carries out a filtering operation based on a moving-average.

4. An image display apparatus as claimed in claim 1, wherein said display data comprises a plurality of data components, and said filter means, said delay means, and said witching means are provided for each of said data components, respectively.

5. An image display apparatus as claimed in claim 4, wherein said image display apparatus further comprises a look-up table, connected to each of said switching means, for outputting a plurality of color data based on said data components.

6. An image display apparatus as claimed in claim 5, wherein said image display apparatus is an ultrasonic diagnostic apparatus having Doppler-analysis means, said data components are scattering data and flowing-speed data, and said Doppler-analysis means being used to divided the display data output from a transducer into the scattering data and the flowing-speed data.

7. An image display apparatus as claimed in claims 1, wherein said display data comprises a plurality of data components, and said filter means, said delay means, and said switching means are provided for each of said data components, respectively.

8. An image display apparatus as claimed in claim 7, wherein said image display apparatus further comprises a look-up table, connected to each of said switching means, for outputting a plurality of color data based on said data components.

9. An image display apparatus as claimed in claim 8, wherein said image display apparatus is an ultrasonic diagnostic apparatus having a Doppler-analysis means, said data components are scattering data and flowing-speed data, and said Doppler-analysis means being used to divide the display data output from a transducer into the scattering data and the flowing-speed data.

10. An image display apparatus for displaying a plurality of images on one display image by carrying out a filtering operation comprising:

memory means for storing display data having a plurality of display-regions along a display scanning direction in one display image of a display;

filter means, connected to said memory means, for applying a filtering operation to the display data read out from said memory means along said display scanning direction;

elongating means, provided at the front portion of said filter means, for elongating the distance between said images in the same scanning line;

read control means, connected to said memory means, for controlling the reading of the display data at a region having a specific time length between adjacent display-regions, when reading the display data from said memory means;

delay means, connected to said filter means, for giving a different delay value to the display data output from said filter means; and switching means, connected to said filter means and said delay means, for switching the display data having a different delay value output from said delay means at a boundary line of said adjacent display-regions, said delay means and said switching means for returning the elongated distance between said images to the previous value being provided at the rear portion of said filter means.

11. An image display apparatus as claimed in claim 10, wherein said read control means reads the display data from a region having a specific time length longer than at least a half of the Kernel-width of the filtering operation of said filter means, when reading the display data from said memory means.

12. An image display apparatus as claimed in claims 10, wherein said filter means carries out a filtering operation based on a moving-average.

13. An image display method for displaying a plurality of display-regions along a display scanning direction in one display image of a display, wherein said image display method comprises the steps of:

controlling to write display data having a plurality of display-regions along a display scanning direction in one display image of a display by elongating the distance between said display-regions in the same scanning line, and storing the display data to a memory at a region having a specific address length between adjacent display-regions;

applying a filtering operation to the display data read out from said memory along said display scanning direction;

giving a different delay value to the display data applied by the filtering operation; and switching the display data having a different delay value at a boundary line of said adjacent display-regions for returning the elongated distance between said display-regions to the previous value.

14. An image display method as claimed in claim 13, wherein the display data is written into said memory at a region having a specific address length longer than at least a half of the Kernel-width of the filtering operation.

15. An image display method as claimed in claims 13, wherein the filtering operation is carried out based on a moving-average.

16. An image display method for displaying a plurality of display-regions along a display scanning direction in one display image of a display, wherein said image display method comprises the steps of:

storing display data having a plurality of display-regions along a display scanning direction in one display image of a display;

controlling the reading of the display data from said memory as a region having a specific time length between adjacent display-regions by elongating the distance between said display-regions in the same scanning line;

applying a filtering operation to the display data read out from said memory along said display scanning direction;

giving a different delay value to the display data applied by the filtering operation; and switching the display data having a different delay value at a boundary line of said adjacent display-regions for returning the elongated distance between said display-regions to the previous value.

17. An image display method as claimed in claim 16, wherein the display data is read from said memory as a region having a specific address length longer than at least a half of the Kernel-width of the filtering operation.

18. An image display method as claimed in claims 16, wherein the filtering operation is carried out based on a moving-average.

* * * * *

UNITED STATES PATENT AND TRADEMARK OFFICE
CERTIFICATE OF CORRECTION

PATENT NO. : 5,677,707
DATED : October 14, 1997
INVENTOR(S) : Yoshitaka ABE et al.

It is certified that error appears in the above-identified patent and that said Letters Patent is hereby corrected as shown below:

Col. 13, line 44, change "witching" to --switching--;
line 55, change "divided" to --divide--;
line 58, change "claims" to --claim--.

Col. 14, line 44, change "claims" to --claim--.

Col. 15, line 5, change "claims" to --claim--.

Col. 18, line 15, change "claims" to --claim--.

Signed and Sealed this

Twenty-fourth Day of March, 1998

Attest:

BRUCE LEHMAN

*Attesting Officer*  *Commissioner of Patents and Trademarks*